Oct. 25, 1955  L. S. GREENLAND  2,721,765
NOZZLES

Filed Feb. 20, 1953  3 Sheets-Sheet 1

Oct. 25, 1955   L. S. GREENLAND   2,721,765
NOZZLES
Filed Feb. 20, 1953   3 Sheets-Sheet 2

Oct. 25, 1955  L. S. GREENLAND  2,721,765
NOZZLES
Filed Feb. 20, 1953  3 Sheets-Sheet 3

Inventor
Leonard Sidney Greenland
By Moses, Nolte, Owen + Berry
Attorneys a fuel supply conduit, a spill conduit for returning excess fuel from the nozzle, a single swirl chamber having at one end a discharge orifice for atomized fuel and communicating at the other end with a spill duct coaxial with
United States Patent Office 2,721,765
Patented Oct. 25, 1955

2,721,765
NOZZLES

Leonard Sidney Greenland, Compton, Wolverhampton, England, assignor to H. M. Hobson Limited, London, England, a British company Application February 20, 1953, Serial No. 338,111

Claims priority, application Great Britain March 27, 1952

3 Claims. (Cl. 299—120)

This invention relates to swirl nozzles for liquid fuel burners of the kind in which the rate of flow of fuel through the discharge orifice of the nozzle for a given supply pressure is controlled by varying the flow of fuel through a spill line communicating with the swirl chamber of the nozzle.

The action in the swirl chamber approximates closely to a free vortex, the fuel acquiring a high angular velocity at the expense of a corresponding drop of pressure towards the centre of the burner. Consequently the pressure available for driving the fuel along the spill passage is reduced, and the metering of the spill flow is therefore rendered more difficult. It is therefore desirable to recover in the most efficient manner the pressure converted into kinetic energy in the spill flow.

With a view to achieving this, the invention provides a swirl nozzle of the above kind in which the rear end of the swirl chamber has an unobstructed circular spill orifice, coaxial with the discharge orifice, which communicates with the spill line by one or more radial or substantially radial diffuser channels extending transversely to the axis of the nozzle, said channel or channels causing the velocity of the fuel to fall with the minimum of turbulence and its pressure to rise as it flows from the swirl chamber to the spill line.

Two forms of spill type swirl nozzle according to the invention will now be described in detail, by way of example, with reference to the accompanying diagrammatic drawings, in which.

Like reference numerals indicate like parts throughout the figures.

Figure 1:
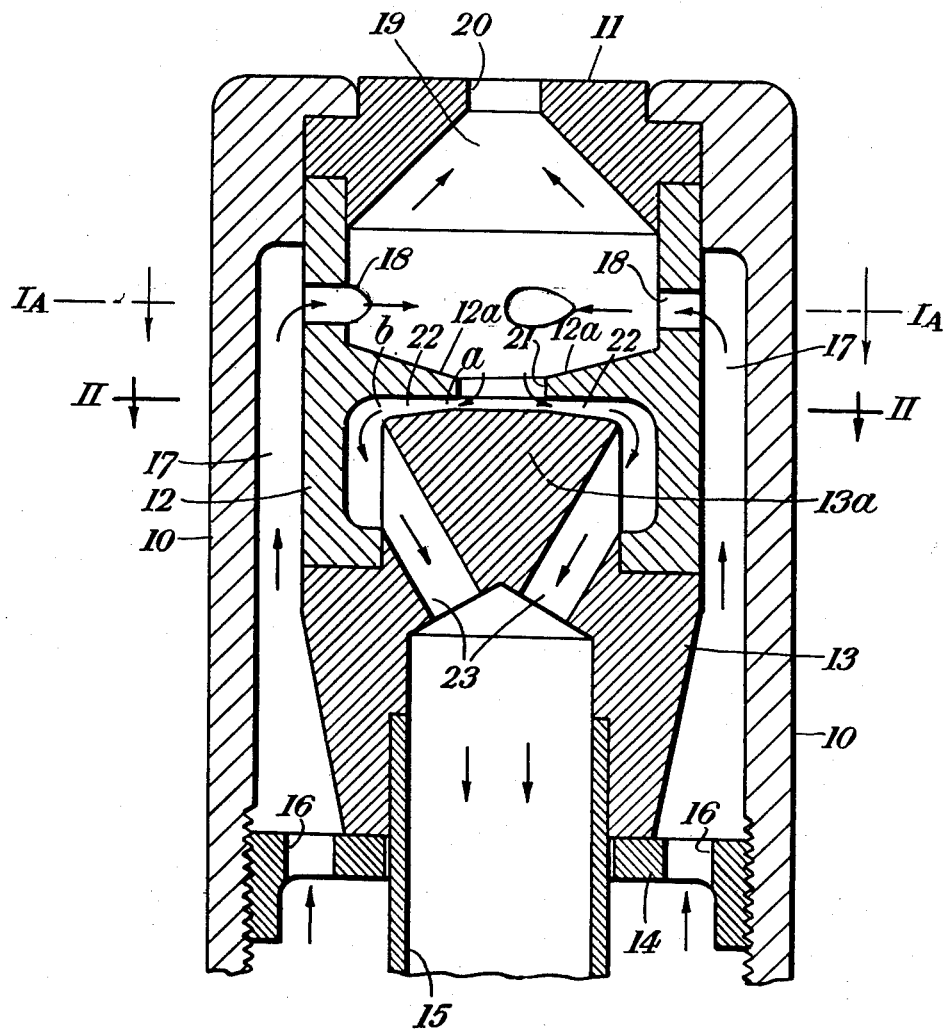
Fig. 1 is a longitudinal section through the first form of nozzle.
Figure 1A:
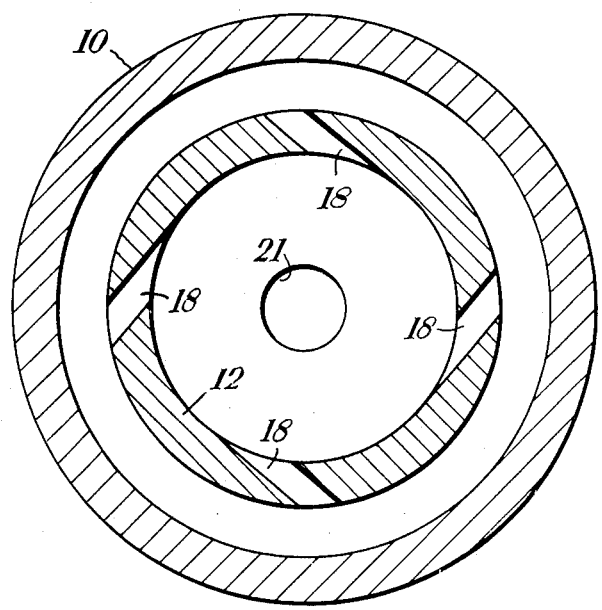
Fig. 1A is a section on the line IA—IA in Fig. 1.
Figure 2:
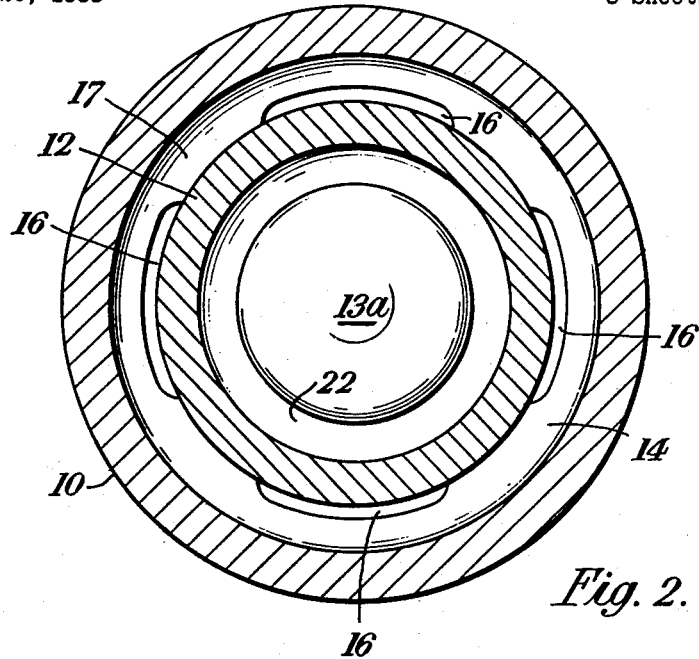
Fig. 2 is a section on the line II—II in Fig. 1.

Considering first of all the nozzle shown in Figs. 1, 1A and 2, this comprises a cylindrical casing 10, within which are disposed aligned inner members 11, 12, 13 which are held in position in the casing by a nut 14. Within, and co-axial with, the casing 10 is a spill line 15. Fuel entering the nozzle passes, through apertures 16 in the nut 14, into an annular supply duct 17 and thence, through tangential inlet passages 18 in the member 12, into a swirl chamber 19, defined by the members 11, 12. The swirl chamber converges at its forward end to a discharge orifice 20 disposed centrally within the member 11. It also converges at its rear end to an unobstructed cylindrical spill duct 21, co-axial with the discharge orifice 20 and terminating in an unobstructed circular spill orifice. From the orifice fuel may spill radially through an annular single-channel diffuser chamber 22, defined by the portions 12ª, 13ª of the members 12, 13 directly to spill ports 23 in the member 13 which communicate with the spill line 15. The diffuser chamber 22, which forms a single radial diffuser channel extending transversely to the axis of the nozzle, is so shaped that, as the fuel flows outwardly through it to the spill passages 23, the velocity of the fuel falls with the minimum of turbulence and its pressure rises. As will be noted, the depth of the diffuser channel increases gradually and progressively from the point $a$ to the point $b$.

Figure 3:
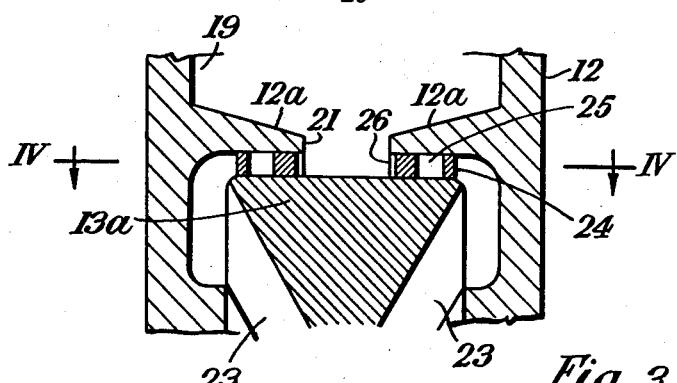
Fig. 3 is a longitudinal section through part of the second form of nozzle.
Figure 4:
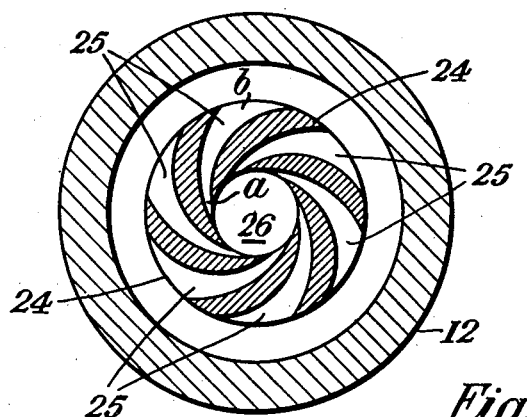
Fig. 4 is a section on the line IV—IV in Fig. 3.

The nozzle shown in Figs. 3 and 4 differs from that just described only in that the diffuser 24, formed with a number of approximately radial diffuser channels 25, is disposed between the members 12ª, 13ª, the diffuser having a central duct 26 aligned with the orifice 21. The channels 25, which extend transversely to the axis of the nozzle and communicate at their inner ends with the spill orifice and at their outer ends with the spill passages 23, are so shaped as to reduce the velocity of the fuel with the minimum of turbulence and thereby promote the most efficient pressure recovery. As will be noted, the width of each channel 25 increases progressively from the point $a$ to the point $b$.

What I claim as my invention and desire to secure by Letters Patent is:

1. A swirl nozzle for a liquid fuel burner, comprising a fuel supply conduit, a spill conduit for returning excess fuel from the nozzle, a single swirl chamber having at one end a discharge orifice for atomized fuel and communicating at the other end with a spill duct coaxial with said discharge orifice and terminating in an unobstructed circular spill orifice, at least one tangential inlet passage to said swirl chamber communicating with the supply conduit and at least one diffuser channel for conducting fuel from the periphery of said spill orifice to said spill conduit, said diffuser channel extending transversely to the axis of the nozzle and increasing progressively in cross section from the end thereof adjoining the spill orifice to the end thereof communicating with the spill conduit.

2. A swirl nozzle for a liquid fuel burner, comprising a fuel supply conduit, a spill conduit for returning excess fuel from the nozzle, a single swirl chamber having at one end a discharge orifice for atomized fuel and communicating at the other end with a spill duct coaxial with said discharge orifice terminating in an unobstructed circular spill orifice, at least one tangential inlet passage to said swirl chamber communicating with the supply conduit and an annular diffuser channel for conducting fuel from the periphery of said spill orifice to said spill conduit, said diffuser channel extending transversely to the axis of the nozzle and increasing progressively in cross section from the end thereof adjoining the spill orifice to the end thereof communicating with the spill conduit.

3. A swirl nozzle for a liquid fuel burner, comprising a fuel supply conduit, a spill conduit for returning excess fuel from the nozzle, a single swirl chamber having at one end a discharge orifice for atomized fuel and communicating at the other end with a spill duct coaxial with said discharge orifice and terminating in an unobstructed circular spill orifice, at least one tangential inlet passage to said swirl chamber communicating with the supply conduit and a plurality of diffuser channels for conducting fuel from the periphery of said spill orifice to said spill conduit, each of said diffuser channels extending substantially tangentially from the periphery of the discharge orifice in a direction transverse to the axis of the nozzle and increasing progressively in cross section from the end thereof adjoining the spill orifice to the end thereof communicating with the spill conduit.

References Cited in the file of this patent

UNITED STATES PATENTS

| 2,177,781 | Haynes | Oct. 31, 1939 |
| 2,373,707 | Peabody | Apr. 17, 1945 |
| 2,374,041 | Saha | Apr. 17, 1945 |

FOREIGN PATENTS

| 649,970 | Great Britain | Feb. 7, 1951 |